(12) United States Patent
Wirt et al.

(10) Patent No.: US 8,145,044 B1
(45) Date of Patent: Mar. 27, 2012

(54) AIR AMMONIA HEATER AND VAPORIZATION CHAMBER SYSTEM

(75) Inventors: Jeffrey Philip Wirt, Tulsa, OK (US); Dan W. Ott, Spring City, PA (US)

(73) Assignee: Honeywell International Inc., Morristown, NJ (US)

( * ) Notice: Subject to any disclaimer, the term of this patent is extended or adjusted under 35 U.S.C. 154(b) by 959 days.

(21) Appl. No.: 12/137,275

(22) Filed: Jun. 11, 2008

(51) Int. Cl.
*A61H 33/06* (2006.01)
(52) U.S. Cl. .................. 392/394; 423/235; 392/396
(58) Field of Classification Search .................. 423/235; 392/394
See application file for complete search history.

(56) References Cited

U.S. PATENT DOCUMENTS

| | | | |
|---|---|---|---|
| 1,244,817 A | | 10/1917 | Willson |
| 2,797,296 A | | 6/1957 | Fowler et al. |
| 4,362,204 A | | 12/1982 | Moore et al. |
| 5,024,171 A | * | 6/1991 | Krigmont et al. ............. 110/345 |
| 5,047,220 A | * | 9/1991 | Polcer ......................... 423/239.1 |
| 5,098,680 A | | 3/1992 | Fellows et al. |
| 5,282,355 A | | 2/1994 | Yamaguchi |
| 5,296,206 A | | 3/1994 | Cho et al. |
| 5,380,499 A | * | 1/1995 | MacInnis ........................ 422/173 |
| 5,437,851 A | * | 8/1995 | MacInnis ...................... 423/239.1 |
| 5,738,024 A | * | 4/1998 | Winegar ........................ 110/345 |
| 6,315,969 B1 | | 11/2001 | Yoshida |
| 6,878,359 B1 | * | 4/2005 | Mathes et al. ............... 423/239.1 |
| 7,065,958 B2 | * | 6/2006 | Funk et al. ......................... 60/286 |
| 7,069,715 B1 | | 7/2006 | Childers |
| 2004/0057888 A1 | * | 3/2004 | Buzanowski ................. 423/235 |
| 2004/0197251 A1 | | 10/2004 | Williamson |
| 2008/0196588 A1 | * | 8/2008 | Gretta et al. ..................... 95/251 |
| 2008/0196763 A1 | * | 8/2008 | Gretta et al. ........................ 137/4 |

* cited by examiner

*Primary Examiner* — Thor Campbell
(74) *Attorney, Agent, or Firm* — Head, Johnson & Kachigian P.C.

(57) ABSTRACT

An air ammonia heater and vaporization chamber system utilizing a contiguous vaporization chamber having an inlet for receiving dilution air, which is passed across at least one heating element integrated into the vaporization chamber to heat and pre-heat the vaporization chamber. Aqueous or anhydrous ammonia is injected from at least one ammonia injector, which is integrated into the vaporization chamber, into the heated dilution air. The heated ammonia/air mixture may then be passed through a bed of packing prior to being released from the vaporization chamber. The bed of packing maintains the heated, homogenous ammonia/air mixture at a minimum temperature of 350° F. to ensure the air/ammonia mixture does not condense. The air ammonia heater and vaporization chamber system may be used in the vaporization and bleeding of ammonia with air for $NO_x$ reduction in the flue gas from heat recovery steam generation systems, packaged boilers, simple cycle catalyst systems or fired heaters.

22 Claims, 4 Drawing Sheets

AIR AMMONIA HEATER AND VAPORIZATION CHAMBER SYSTEM

FIELD OF THE INVENTION

This invention relates generally to an air ammonia heater and vaporization chamber system, and more particularly to an air ammonia heater and vaporization chamber system for the rapid heating and vaporization of ammonia prior to its injection in a flow of flue gas emitted from a power plant.

DESCRIPTION OF THE RELATED ART

Power plants customarily make use of a cleaning process, such as a selective catalytic reduction system, to remove toxic materials, such as nitrogen oxide ($NO_x$), from a flow of flue gas. $NO_x$ refers to the cumulative emissions of nitric oxide (NO), nitrogen dioxide ($NO_2$) and trace quantities of other chemicals during combustion, which are environmentally hazardous substances. Combustion of fossil fuels generates some level of $NO_x$ due to high temperatures and availability of oxygen and nitrogen from both the fuel and air. $NO_x$ emissions may be controlled using low $NO_x$ combustion technology and postcombustion techniques, such as selective catalytic reduction (SCR). SCR systems catalytically reduce flue gas $NO_x$ to nitrogen and water using ammonia ($NH_3$) in a chemical reaction.

SCR systems treat the $NO_x$ before the gas is released into the atmosphere. SCR systems rely on a catalyst to treat flue gas as the gas passes through the SCR system. Because the catalyst is an integral part of the SCR chemical reaction, SCR systems attempt to provide maximum exposure of the catalyst to the flue gas in order to ensure that all the flue gas comes sufficiently into contact with the catalyst for treatment.

Ammonia in commonly injected through an injection grid into the flow of flue gas by utilizing an external ammonia vaporization system wherein liquid ammonia, either in an anhydrous or aqueous state, is vaporized in a heater or vaporizer, mixed with dilution air, and then routed to the injection grid for injection into the flow of flue gas at the SCR system. Typically, the ammonia is diluted with water prior to being injected through the injection grid into the flow of flue gas.

SCR systems require the injection of vaporized ammonia into the flow of flue gas. SCR systems require a pre-heated vaporization chamber in which the ammonia is vaporized when passing through the chamber, prior to its introduction to the flow of flue gas. The difficulty encountered with this process is that the ammonia must be heated sufficiently to vaporize it otherwise the ammonia would be injected as a liquid and would render the process ineffective. The usual vaporization chamber requires copious amounts of time to reach the temperature required for vaporization before the power plant's initial start up. The ability to quickly heat the vaporization chamber to allow the power plant to startup upon short notice is oftentimes pivotal for those who run "peak" power plants (these provide additional power to existing systems during times of peak power consumption during the year). An important aspect in obtaining these contracts to provide peak power in an area is how quickly the power plant can startup and provide power. Therefore, the need for a rapid heating vaporization chamber is essential. The air ammonia heater and vaporization chamber system disclosed herein is designed to effectively cope with this need.

Known systems typically utilize an external heater to heat a flow of dilution air. The external heater is in fluid communication with a vaporization chamber. The exterior of these vaporization chambers may be wrapped with band heaters to further heat the vaporization chamber. These systems are not efficient and/or useful, in that they require a long period of time to heat the vaporization chamber to a temperature level sufficient to vaporize injected ammonia. Further, these systems require a large footprint in the power plant.

It is therefore desirable to provide an air ammonia heater and vaporization chamber system that provides rapid and efficient power plant startup.

It is further desirable to provide an air ammonia heater and vaporization chamber system having the ability to more effectively reduce the toxins than any other known vaporization chamber.

It is still further desirable to provide an air ammonia heater and vaporization chamber system having the compatibility and interchangeability to work with any type of power plant.

It is yet further desirable to provide an air ammonia heater and vaporization chamber system utilizing an all-in-one vaporization chamber having an inlet for receiving dilution air, which is passed across at least one heating element integrated into the vaporization chamber to heat and pre-heat the vaporization chamber.

It is yet further desirable to provide an air ammonia heater and vaporization chamber system wherein a heated ammonia/air mixture may be passed through a bed of packing prior to being released from the vaporization chamber.

It is yet further desirable to provide an air ammonia heater and vaporization chamber system that may utilize a bed of packing to maintain a heated, homogenous ammonia/air mixture at a minimum temperature of 350° F. to ensure the air/ammonia mixture does not condense.

It is yet further desirable to provide an air ammonia heater and vaporization chamber system that may be used in the vaporization and bleeding of ammonia with air for $NO_x$ reduction in the flue gas from heat recovery steam generation systems, packaged boilers, simple cycle catalyst systems or fired heaters.

It is yet further desirable to provide an air ammonia heater and vaporization chamber system that requires less space and is more compact that current ammonia vaporization systems.

SUMMARY OF THE INVENTION

In general, in a first aspect, the invention relates to an ammonia vaporization chamber having an inlet, an internal heating element, an ammonia injector and an outlet contiguously integrated within the vaporization chamber. The inlet in the vaporization chamber allows is capable of receiving a supply of dilution air, and the outlet allows for release of a heated, homogenous ammonia/air mixture to a flow of flue gas. The ammonia/air mixture released from the outlet of the vaporization chamber should be heated to a minimum of 350° F. The outlet of the vaporization chamber may be closed to retain heat within the vaporization chamber. The internal heating element is integrated into the vaporization chamber to heat and pre-heat the vaporization chamber, while the ammonia injector is integrated into the vaporization chamber for injecting an ammonia. The vaporization chamber may be cylindrical, and the heating element integrated therein may be an electric air heater.

The heating element may be a plurality of heating elements integrated into opposing sides of the vaporization chamber and aligned in a substantially horizontally staggered arrangement. The ammonia injector may be a perforated cylindrical pipe having a plurality of nozzles from which the ammonia is injected. The ammonia injector may be a plurality of ammonia injectors integrated into opposing sides of the chamber.

The ammonia injected from the ammonia injector into the vaporization chamber may be anhydrous or aqueous ammonia.

The ammonia vaporization chamber may include a bed of packing integrated into the vaporization chamber downstream of the ammonia injector to ensure the ammonia/air mixture does not condense. The bed of packing may be housed within an internal packing chamber. The packing chamber may include a first perforated plate on an upstream side and a second perforated plate on a downstream side thereof. In addition, at least one port may be provided in the vaporization chamber and the packing chamber for allowing access to the bed of packing. Furthermore, at least one perforated plate can be integrated into the vaporization chamber upstream from the heating element.

In general, in a second aspect, the invention relates to an air ammonia heater and vaporization chamber system having a cylindrical vaporization chamber including an inlet in the vaporization chamber for receiving a supply of dilution air; a plurality of internal heating elements integrated into the vaporization chamber downstream of the inlet to heat and pre-heat the vaporization chamber; a plurality of ammonia injectors integrated into the vaporization chamber downstream of the heating elements for injecting an anhydrous or aqueous ammonia; a bed of packing integrated into the vaporization chamber downstream of the ammonia injectors to prevent a heated, homogenous ammonia/air mixture from condensing; and an outlet in the vaporization chamber for releasing the heated, homogenous ammonia/air mixture to a flow of flue gas.

The heating elements of the air ammonia heater and vaporization chamber system may be electric air heaters. The heating elements may be integrated into opposing sides of the vaporization chamber and arranged in a substantially horizontally staggered alignment. Further, the ammonia injectors can be integrated into opposing sides of the vaporization chamber and aligned in parallel. The air ammonia heater and vaporization chamber system may further include at least one perforated plate integrated into the vaporization chamber upstream from the heating elements. In addition, the bed of packing may be housed within an internal packing chamber. The packing chamber can include a first perforated plate on an upstream side and a second perforated plate on a downstream side thereof.

Other advantages and features will be apparent from the following description, and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
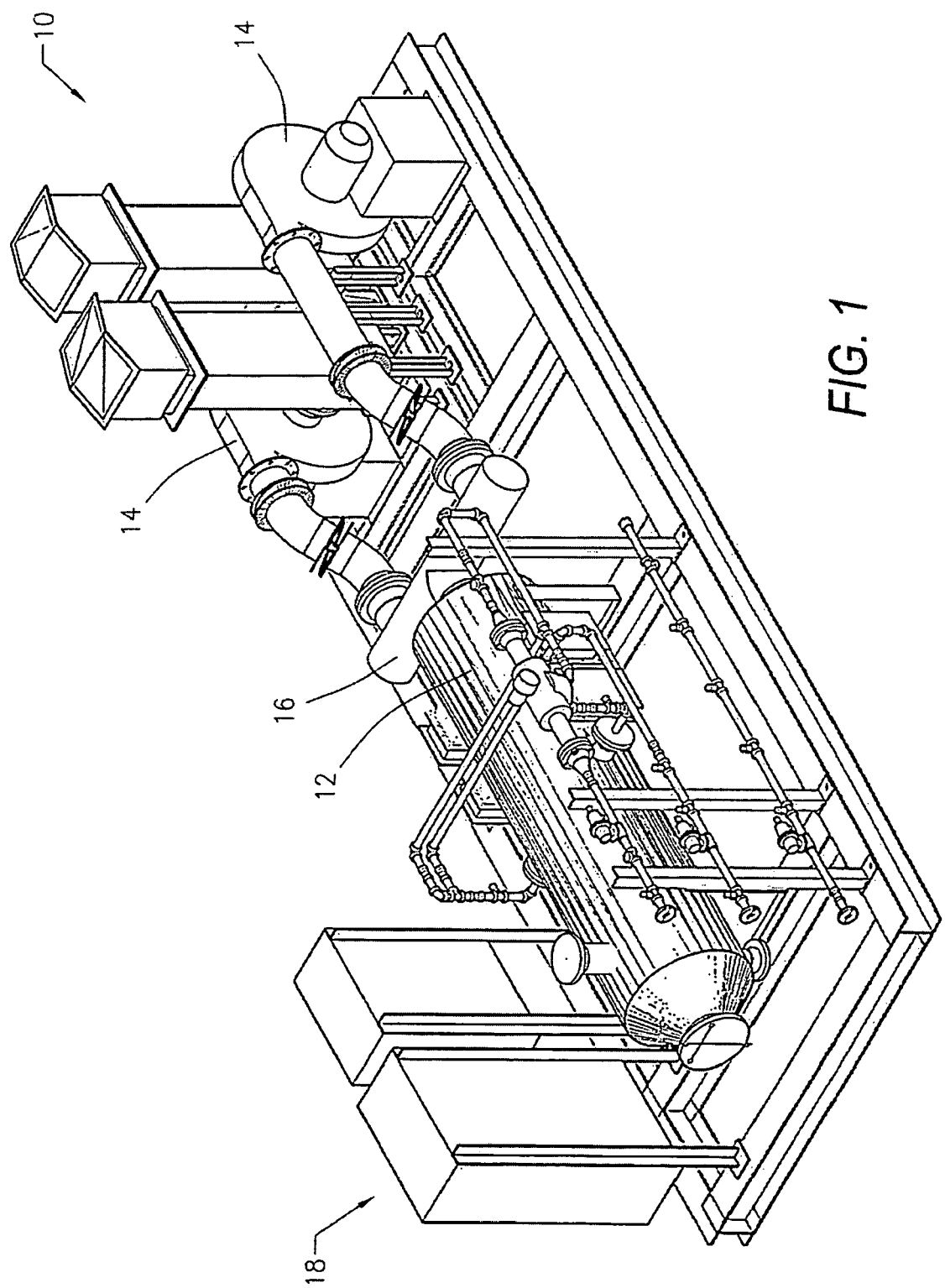
FIG. 1 is a perspective view of an ammonia vaporization skid utilizing an example of an ammonia vaporization chamber in accordance with an illustrative embodiment of the air ammonia heater and vaporization chamber system disclosed herein.

Referring to the figures of the drawings, wherein like numerals of reference designate like elements throughout the several views, and initially to FIG. 1 illustrating an ammonia vaporization skid 10 utilizing the air ammonia heater and vaporization chamber system 12 disclosed herein. The entire air ammonia heater and vaporization chamber system 12 may be constructed to be mounted on the ammonia vaporization skid 10 to be easily transported to a desired location. As can be seen, the air ammonia heater and vaporization chamber system 12 may receive dilution air from one or more blowers 14 to impart a flow of air through the air ammonia heater and vaporization chamber system 12. The blowers 14 may be variable speed to increase or decrease the flow rate of the dilution air through the air ammonia heater and vaporization chamber system 12. The alteration of flow rate from the blowers 14 will effect the movement of dilution air through the air ammonia heater and vaporization chamber system 12, thereby allowing more complete vaporization of ammonia and/or allowing for longer or shorter heating time of the injected ammonia. The dilution air from the blowers 12 may enter the air ammonia heater and vaporization chamber system through a manifold 16.

The ammonia vaporization skid 10 may also include a controller 18 to regulate the flow rate of the dilution air from the blowers and/or regulate the flow of injected ammonia into the air ammonia heater and vaporization chamber system 12, to provide the optimum amount of heated, homogenous ammonia/air mixture to a downstream injection grid (not shown) incorporated into a selective catalytic reduction (SCR) system. The injection grid (not shown) may be of the type discussed in Applicants' co-pending application, titled Ammonia Injection Grid for a Selective. Catalytic Reduction System, Ser. No. 12/137,324, which is incorporated herein by reference. Further, the injection grid may be integrated into an SCR system, such as of the type discussed in Applicants' co-pending application, titled Multi-Bed Selective Catalytic Reduction System, Ser. No. 12/137,302, which is incorporated herein by reference.

Figure 2:
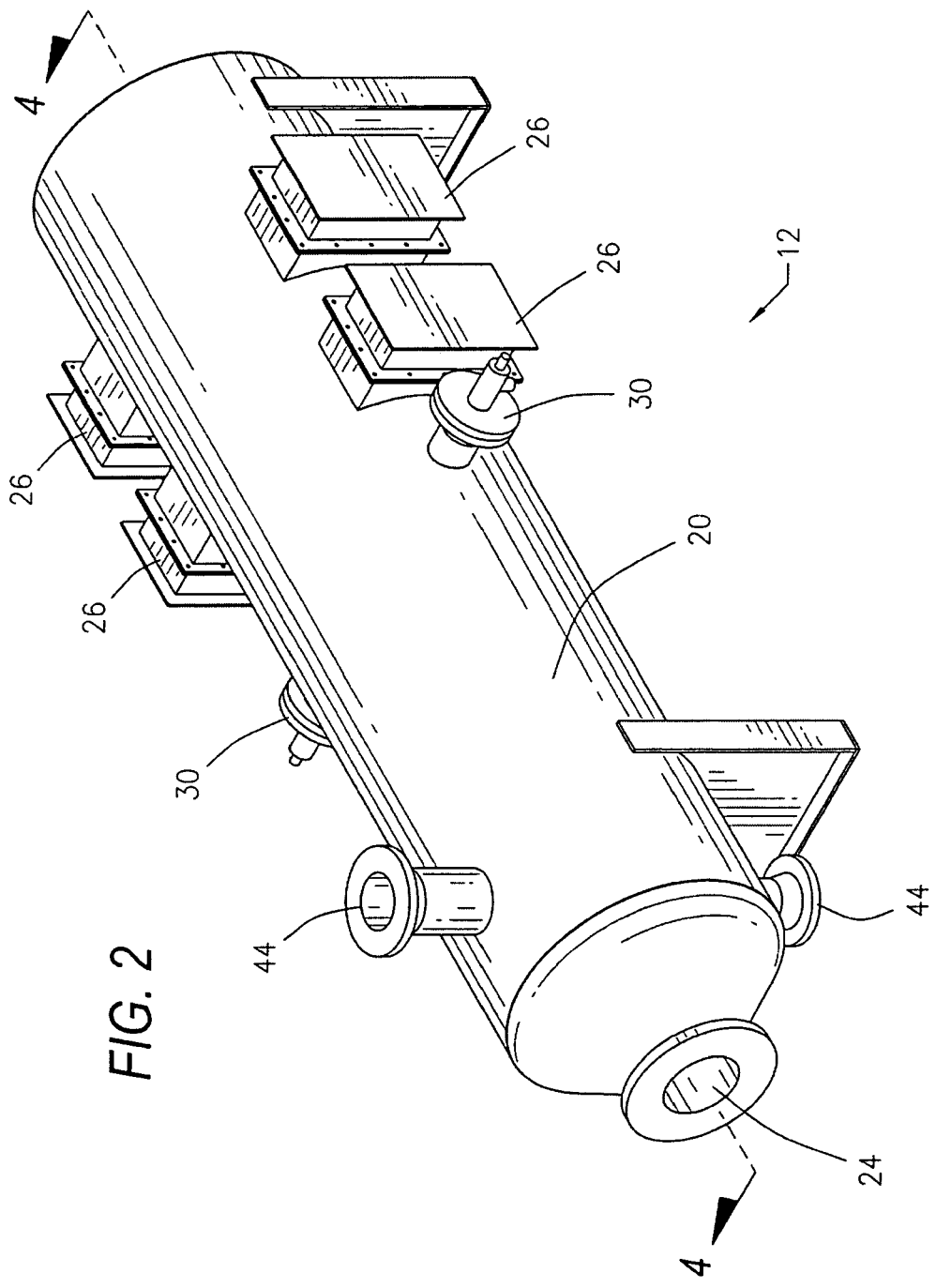
FIG. 2 is a perspective view of an example of an ammonia vaporization chamber in accordance with an illustrative embodiment of the air ammonia heater and vaporization chamber system disclosed herein.
Figure 3:
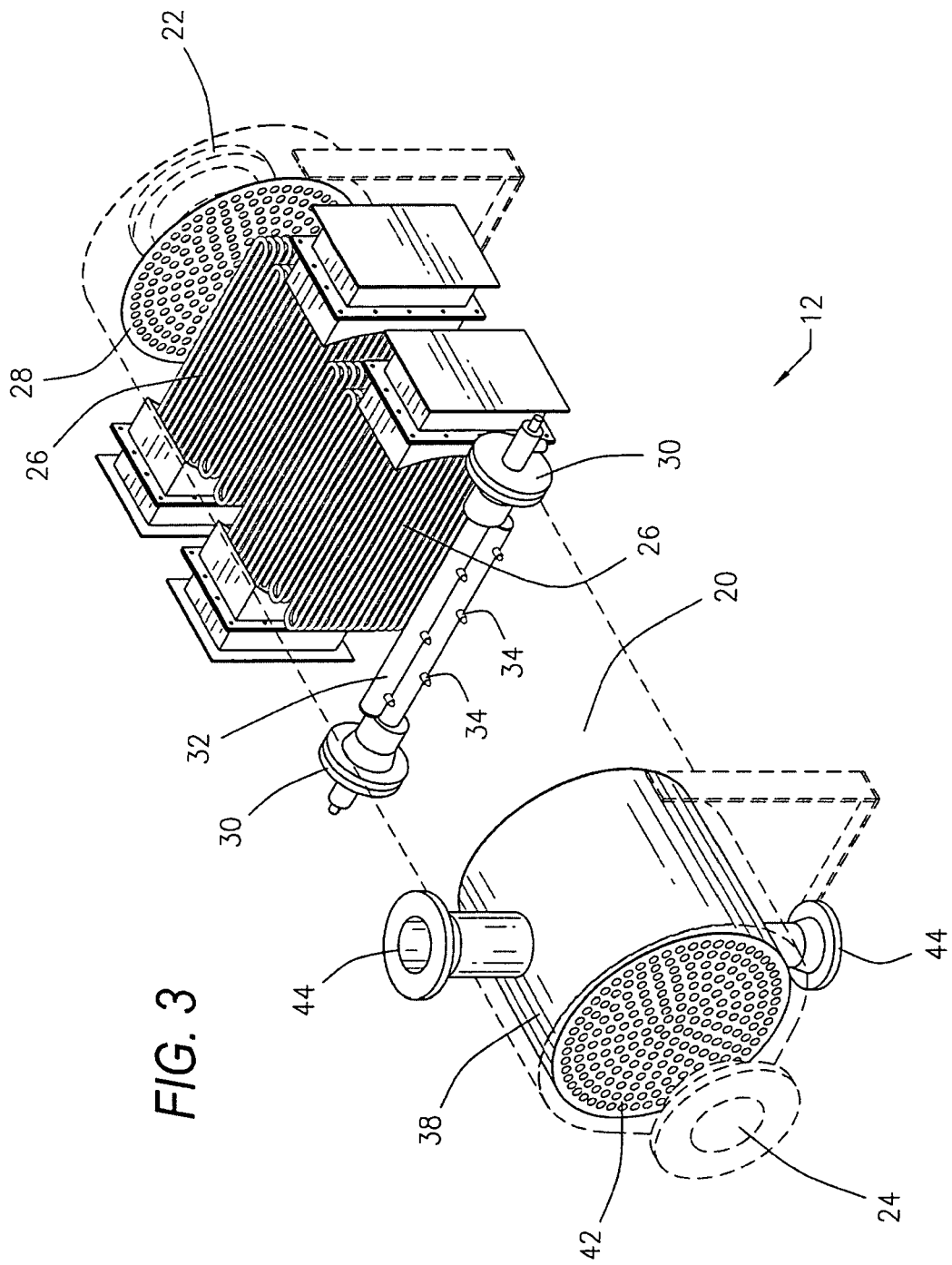
FIG. 3 is a cutaway view of an example of an ammonia vaporization chamber in accordance with an illustrative embodiment of the air ammonia heater and vaporization chamber system disclosed herein.
Figure 4:
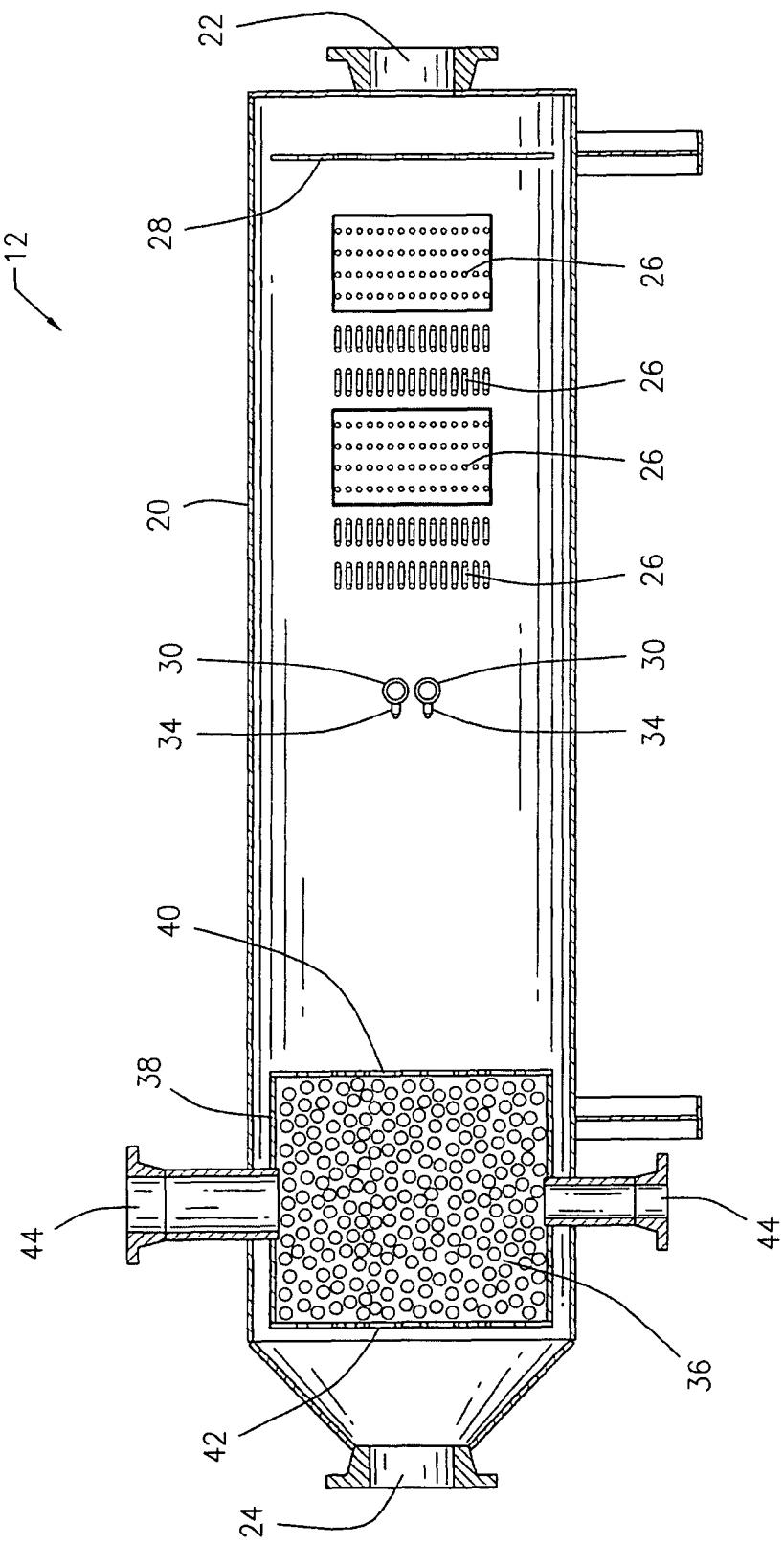
FIG. 4 is a cross section view along line 4-4 of the ammonia vaporization chamber shown in FIG. 2.

Turning now to FIGS. 2 through 4, the air ammonia heater and vaporization chamber system 12 includes a vaporization chamber 20, which may be cylindrical, rectangular or any other geometric shape. At one end of the vaporization chamber 20 is an inlet 22 for receiving a supply of dilution air, such as from blowers 14. At the opposing end of the vaporization chamber 20 is an outlet 24 for releasing a heated, homogenous ammonia/air mixture to a flow of flue gas, such as through a downstream ammonia injection grid (not shown). The vaporization chamber 20 may be closed to retain heat and vaporized ammonia within the vaporization chamber 20. At least one heating element 26 is integrated into an interior portion of the vaporization chamber 20. The heating element 26 is disposed within the vaporization chamber 20 downstream from the inlet 22 to heat and pre-heat the vaporization chamber 20 and dilution air. A perforated plate 28 may be integrated into the vaporization chamber 20 downstream of the inlet 22 and upstream of the heating element 26. The perforated plate 28 assists in distributing the inputted dilution air across the heating element 26 for even and consistent heating. Also integrated into the vaporization chamber 20 is at least one ammonia injector 30 for injecting ammonia into the vaporization chamber 20. The inlet 22, the outlet 24, the heating element 26 and the ammonia injector 30 may all be contiguous within the vaporization chamber 20.

The heating element 26 may be a plurality of heating elements. Each heating element 26 may be an electric air heater or other type of internal heating element. As shown in the Figures, the heating elements 26 may be integrated into opposing sides of the vaporization chamber 20 and also may be in a substantially horizontally staggered arrangement. Each heating element 26 may have a length substantially equal to a width of the vaporization chamber 20 to ensure sufficient contact with and heating of the inputted dilution air.

The ammonia injector 30 may be a cylindrical, perforated pipe 32 having at least one spray nozzle 34 for injecting ammonia into the heated dilution air. Compressed air may aid in atomizing the injection sprays into very fine droplets, thereby enhancing dispersion of the ammonia into the heated dilution air. The droplets of injected ammonia absorb heat from the heated dilution air and vaporize. The internal heating element 26 not only heats the dilution air to vaporize the injected ammonia, it also maintains the vaporization chamber 20 at an elevated temperature, such as above 350° F. The injected ammonia may be either aqueous or anhydrous ammonia. The ammonia injector 30 may be a plurality of ammonia injectors integrated into the vaporization chamber 20 downstream of the heating element 26. Similar to the heating element 26, the ammonia injectors 30 may be integrated into opposing sides of the vaporization chamber 20 and may also be aligned in parallel.

The air ammonia heater and vaporization chamber system 12 may also include a bed of packing 36 integrated into the vaporization chamber 20 downstream of the ammonia injector 30 to help ensure the heated ammonia/air mixture does not condense. As shown in FIGS. 3 and 4, the bed of packing 36 may be housed within an internal packing chamber 38. The internal packing chamber 38 may include a first perforated plate 40 on an upstream side of the internal packing chamber 38 and may also include a second perforated plate 42 on a downstream side of the internal packing chamber 38. Further, the internal packing chamber 38 may include at least one port 44 to allow periodic maintenance, cleaning, repair and/or replacement of the bed of packing 32. The bed of packing 36 aids in the collection of unvaporized ammonia and also aids in sustaining the elevated temperature within the vaporization chamber 20. The bed of packing 36 may be one inch, 304 stainless steel pall rings, one inch, 304 stainless steel tubing, a static mixer or other packing. Stainless steel pall rings provide higher capacity and lower pressure drop than other random packings. The opened cylinder walls and inward bent protrusions of the pall rings allow greater capacity and lower pressure drop than standard cylindrical rings. The pall rings open ring design also maintains an even distribution and resists wall-channeling tendencies. The interior and exterior contacting surfaces of the pall rings provide for an effective distribution of injected ammonia and heated dilution air and also resist plugging, fouling and nesting.

The air ammonia heater and vaporization chamber system 12 heats the inputted dilution air using the heating element 26 in a convection and/or thermal conductance manner. Further, the internal heating element 26 along with the bed of packing 36 maintain a relatively constant elevated temperature within the vaporization chamber, thus allowing for rapid start up time. Further, the all-in-one design of the air ammonia heater and vaporization chamber system 12 requires less space in an otherwise crowded power plant. Furthermore, the vaporization chamber 20 of the air ammonia heater and vaporization chamber system 12 may be horizontally aligned and may also be lower to the skid allowing for easy maintenance.

Whereas, the devices and methods have been described in relation to the drawings and claims, it should be understood that other and further modifications, apart from those shown or suggested herein, may be made within the spirit and scope of this invention.

What is claimed is:

1. An ammonia vaporization chamber, comprising:
    an inlet in a vaporization chamber for receiving a supply of dilution air;
    a plurality of internal heating elements integrated into opposing sides of the vaporization chamber to heat and pre-heat the vaporization chamber;
    an ammonia injector integrated into the vaporization chamber for injecting an ammonia;
    an outlet in the vaporization chamber for releasing a heated, homogenous ammonia/air mixture to a flow of flue gas; and
    wherein the inlet, the heating element, the ammonia injector and the outlet are contiguous within the vaporization chamber.

2. The ammonia vaporization chamber of claim 1 wherein the vaporization chamber is cylindrical.

3. The ammonia vaporization chamber of claim 1 wherein the heating element is an electric air heater.

4. The ammonia vaporization chamber of claim 1 wherein the heating elements are substantially horizontally staggered.

5. The ammonia vaporization chamber of claim 1 wherein the ammonia injector is a perforated cylindrical pipe having a plurality of nozzles from which the ammonia is injected.

6. The ammonia vaporization chamber of claim 1 wherein the ammonia injector is a plurality of ammonia injectors.

7. The ammonia vaporization chamber of claim 6 wherein the ammonia injectors are integrated into opposing sides of the vaporization chamber and are aligned in parallel.

8. The ammonia vaporization chamber of claim 1 wherein the ammonia injected from the ammonia injector into the vaporization chamber is anhydrous or aqueous ammonia.

9. The ammonia vaporization chamber of claim 1 further comprising a bed of packing integrated into the vaporization chamber downstream of the ammonia injector to ensure the ammonia/air mixture does not condense.

10. The ammonia vaporization chamber of claim 9 wherein the bed of packing is housed within an internal packing chamber and wherein the packing chamber includes a first perforated plate on an upstream side and a second perforated plate on a downstream side thereof.

11. The ammonia vaporization chamber of claim 10 further comprising at least one port in the vaporization chamber and the packing chamber for allowing access to the bed of packing.

12. The ammonia vaporization chamber of claim 1 wherein the ammonia/air mixture released from the outlet of the vaporization chamber is heated to a minimum of 350° F.

13. The ammonia vaporization chamber of claim 1 further comprising at least one perforated plate integrated into the vaporization chamber upstream from the heating element.

14. The ammonia vaporization chamber of claim 1 wherein the outlet of the vaporization chamber is capable of being closed to retain heat within the vaporization chamber.

15. An air ammonia heater and vaporization chamber system, comprising:
- a cylindrical vaporization chamber;
- an inlet in the vaporization chamber for receiving a supply of dilution air;
- a plurality of internal heating elements integrated into the vaporization chamber downstream of the inlet to heat and pre-heat the vaporization chamber;
- a plurality of ammonia injectors integrated into the vaporization chamber downstream of the heating elements for injecting an anhydrous or aqueous ammonia;
- a bed of packing integrated into the vaporization chamber downstream of the ammonia injectors to prevent a heated, homogenous ammonia/air mixture from condensing; and
- an outlet in the vaporization chamber for releasing the heated, homogenous ammonia/air mixture to a flow of flue gas wherein the heating elements are integrated into opposing sides of the vaporization chamber and arranged in a substantially horizontally staggered alignment, and wherein the ammonia injectors are integrated into opposing sides of the vaporization chamber and are aligned in parallel.

16. The air ammonia heater and vaporization chamber system of claim 15 wherein the heating elements are electric air heaters.

17. The air ammonia heater and vaporization chamber system of claim 15 further comprising at least one perforated plate integrated into the vaporization chamber upstream from the heating elements.

18. The air ammonia heater and vaporization chamber system of claim 15 wherein the bed of packing is housed within an internal packing chamber and wherein the packing chamber includes a first perforated plate on an upstream side and a second perforated plate on a downstream side thereof.

19. An ammonia vaporization chamber, comprising:
- an inlet in a vaporization chamber for receiving a supply of dilution air;
- an internal heating element integrated into the vaporization chamber to heat and pre-heat the vaporization chamber;
- a plurality of ammonia injectors integrated into opposing sides of the vaporization chamber aligned in parallel for injecting an ammonia;
- an outlet in the vaporization chamber for releasing a heated, homogenous ammonia/air mixture to a flow of flue gas; and
- wherein the inlet, the heating element, the ammonia injector and the outlet are contiguous within the vaporization chamber.

20. An ammonia vaporization chamber, comprising:
- an inlet in a vaporization chamber for receiving a supply of dilution air;
- an internal heating element integrated into the vaporization chamber to heat and pre-heat the vaporization chamber;
- an ammonia injector integrated into the vaporization chamber for injecting an ammonia;
- an outlet in the vaporization chamber for releasing a heated, homogenous ammonia/air mixture to a flow of flue gas;
- wherein the inlet, the heating element, the ammonia injector and the outlet are contiguous within the vaporization chamber; and
- a bed of packing integrated into the vaporization chamber downstream of the ammonia injector to ensure the ammonia/air mixture does not condense and wherein the bed of packing is housed within an internal packing chamber and wherein the packing chamber includes a first perforated plate on an upstream side and a second perforated plate on a downstream side thereof.

21. An air ammonia heater and vaporization chamber system, comprising:
- a cylindrical vaporization chamber;
- an inlet in the vaporization chamber for receiving a supply of dilution air;
- a plurality of internal heating elements integrated into the vaporization chamber downstream of the inlet to heat and pre-heat the vaporization chamber;
- a plurality of ammonia injectors integrated into the vaporization chamber downstream of the heating elements for injecting an anhydrous or aqueous ammonia;
- a bed of packing integrated into the vaporization chamber downstream of the ammonia injectors to prevent a heated, homogenous ammonia/air mixture from condensing;
- an outlet in the vaporization chamber for releasing the heated, homogenous ammonia/air mixture to a flow of flue gas; and
- at least one perforated plate integrated into the vaporization chamber upstream from the heating elements.

22. An air ammonia heater and vaporization chamber system, comprising:
- a cylindrical vaporization chamber;
- an inlet in the vaporization chamber for receiving a supply of dilution air;
- a plurality of internal heating elements integrated into the vaporization chamber downstream of the inlet to heat and pre-heat the vaporization chamber;
- a plurality of ammonia injectors integrated into the vaporization chamber downstream of the heating elements for injecting an anhydrous or aqueous ammonia;
- a bed of packing integrated into the vaporization chamber downstream of the ammonia injectors to prevent a heated, homogenous ammonia/air mixture from condensing; and
- an outlet in the vaporization chamber for releasing the heated, homogeneous ammonia/air mixture to a flow of flue gas wherein the bed of packing is housed within an internal packing chamber and wherein the packing chamber includes a first perforated plate on an upstream side and a second perforated plate on a downstream side thereof.

* * * * *